UNITED STATES PATENT OFFICE.

KARL HEINRICH WIMMER, OF BREMEN, GERMANY.

PROCESS OF DECAFFEINIZING COFFEE-BEANS.

1,009,610.  Specification of Letters Patent.  Patented Nov. 21, 1911.

No Drawing.  Application filed March 17, 1911.  Serial No. 615,084.

*To all whom it may concern:*

Be it known that I, KARL HEINRICH WIMMER, subject of the German Emperor, residing at Bremen, Germany, have invented certain new and useful Improvements in Processes of Decaffeinizing Coffee-Beans, of which the following is a specification.

The extraction of caffein from unbroken green coffee beans is already practiced on a large scale by various processes. In most cases the coffee beans are first subjected to a more or less complicated preliminary treatment adapted to loosen the structure of the cellular tissue of the coffee beans and to convert the caffein into a soluble form, after which the caffein is extracted by suitable solvents. I have found, that the latter may be dispensed with and the caffein extracted from the unbroken beans in a simple manner, if the coffee beans are first treated with acidulated water with the aid of heat and subsequently subjected to extraction with water. For instance, water may be poured over the coffee beans in a suitable receptacle provided with a steam-heating coil, until the beans are saturated with water and covered by the same. Subsequently formic acid is added, preferably in the proportion of about 5 liters of 30 per cent. acid to 10 sacks of coffee, subsequently steam is admitted to the coil, so as to heat the contents of the receptacle for about 20 to 25 minutes, after which the acid water is drawn off, and if required the heating repeated with fresh water, which may be acidulated to accelerate the process. The treating of the coffee is had under a pressure of from one-half to four atmospheres at a temperature of from 70 to 120° C. The aqueous extracts are collected and the caffein is separated from the same in a known manner, after which the remaining extract is suitably concentrated and the beans are impregnated with the same in order to restore the extractive matter (minus the caffein) to the coffee beans, which process may be performed with the aid of pressure or of a vacuum. Finally the coffee beans are dried and roasted in a known manner.

What I claim is:—

1. The process of treating unbroken green coffee beans to relieve the same of caffein while retaining the other constituents, which consists in treating under a pressure of from one-half to four atmospheres the coffee beans with acidulated water at a temperature of from 70 to 120° C., subjecting them to extraction with hot water at a temperature of from 70 to 120° C., separating the caffein from the extract thus obtained, impregnating the coffee-beans with the remaining extract, and finally drying and roasting them, substantially as described.

2. The process of treating unbroken green coffee beans to relieve them of caffein, while retaining the other constituents, which consists in treating the coffee beans with acidulated water with the aid of heat, subjecting them to extraction with hot water, separating the caffein from the extract thus obtained and impregnating the coffee beans with the remaining extract, substantially as described.

In testimony whereof I have hereunto set my hand in presence of two subscribing witnesses.

KARL HEINRICH WIMMER.

Witnesses:
FERDINAND REICH,
FREDERICK HOYERMANN.